United States Patent
Garm (10) Patent No.: US 9,739,260 B2
(45) Date of Patent: Aug. 22, 2017

(54) WIND TURBINE BLADE HAVING A BOND LINE ADJACENT A SANDWICH PANEL OF THE BLADE

(71) Applicant: LM WP PATENT HOLDING A/S, Kolding (DK)

(72) Inventor: Jesper Hasselbalch Garm, Kolding (DK)

(73) Assignee: LM WINDPOWER A/S, Kolding (DK)

( * ) Notice: Subject to any disclaimer, the term of this patent is extended or adjusted under 35 U.S.C. 154(b) by 0 days.

(21) Appl. No.: 14/906,585

(22) PCT Filed: Jul. 23, 2014

(86) PCT No.: PCT/EP2014/065851
§ 371 (c)(1),
(2) Date: Jan. 21, 2016

(87) PCT Pub. No.: WO2015/014692
PCT Pub. Date: Feb. 5, 2015

(65) Prior Publication Data
US 2016/0168997 A1     Jun. 16, 2016

(30) Foreign Application Priority Data
Jul. 30, 2013    (EP) .................................... 13178448

(51) Int. Cl.
*F03D 1/06*       (2006.01)
*B29L 31/08*     (2006.01)

(52) U.S. Cl.
CPC ...... *F03D 1/0675* (2013.01); *B29L 2031/085* (2013.01); *F05B 2260/30* (2013.01); *Y02E 10/721* (2013.01); *Y02P 70/523* (2015.11)

(58) Field of Classification Search
None
See application file for complete search history.

(56) References Cited

U.S. PATENT DOCUMENTS

| 4,976,587 A | 12/1990 | Johnston et al. |
| 8,047,800 B2 | 11/2011 | Nies |

(Continued)

FOREIGN PATENT DOCUMENTS

| DE | 102011076082 A1 | 11/2012 |
| GB | 2484942 | 5/2012 |
| WO | 2010/023140 A1 | 3/2010 |

OTHER PUBLICATIONS

International Search Report of corresponding PCT/EP2014/065851 mailed Sep. 9, 2014.

*Primary Examiner* — Gregory Anderson
*Assistant Examiner* — Jason Davis
(74) *Attorney, Agent, or Firm* — Nath, Goldberg & Meyer; Jerald L. Meyer; Tanya E. Harkins (57) ABSTRACT

A wind turbine blade and an associated method of manufacture is described, wherein a structural bond line of the blade is positioned to be adjacent to a sandwich panel construction of the blade. By locating the structural bond line nest to a sandwich region of the blade, the buckling strength of the joint is improved and the risk of crack initiation in the adhesive joint is reduced considerably. This allows for a reduction in the amount of structural adhesive used in the blade, and/or a reduction in the amount of core material which is required in the sandwich panel to maintain the required blade stiffness. A particular advantage is provided in the region of the trailing edge of the blade, wherein the relocated structural joint considerably reduces the risk of buckling in the trailing edge side of the blade.

12 Claims, 4 Drawing Sheets

(56) References Cited

U.S. PATENT DOCUMENTS

| | | | |
|---|---|---|---|
| 8,105,045 B2 * | 1/2012 | Stewart | F03D 1/0675 |
| | | | 416/229 R |
| 8,556,590 B2 * | 10/2013 | Esaki | F03D 1/0675 |
| | | | 416/226 |
| 2011/0211970 A1 | 9/2011 | Nies | |
| 2012/0141282 A1 | 6/2012 | Esaki et al. | |

* cited by examiner

WIND TURBINE BLADE HAVING A BOND LINE ADJACENT A SANDWICH PANEL OF THE BLADE

This is a National Phase Application filed under 35 U.S.C. 371 as a national stage of PCT/EP2014/065851, filed Jul. 23, 2014, an application claiming the benefit of European Application No. 13178448.0, filed Jul. 30, 2013, the content of each of which is hereby incorporated by reference in its entirety.

FIELD OF THE INVENTION

The present invention relates to a wind turbine blade, in particular a wind turbine blade having a structural bond line arranged adjacent a sandwich panel of the blade.

BACKGROUND OF THE INVENTION

Wind turbine blades are generally constructed by the formation of first and second blade shells by the layup and subsequent infusion with resin of fibre material, e.g. glass fibre and/or carbon fibre, in a suitably shaped mould. The blade shells, which are usually shaped to form complimentary pressure- and suction-side profiles of a wind turbine blade, can then be joined together along the leading and trailing edges of the shells to form a wind turbine blade, through the application of a structural adhesive between the edges of the shells.

One of the known construction techniques for wind turbine blades is the use of sandwich panel constructions in the blade body. In such blades, the shell of the wind turbine blade comprises sections wherein a lightweight core material of e.g. balsawood or foam is located between inner and outer layers of fibre-reinforced material. The use of such a construction provides a relatively cheap and lightweight structure having increased stiffness and buckling resistance, compared to a shell formed from fibre-reinforced material alone.

One of the continued challenges in wind turbine blade manufacture is the development of wind turbine blades having increased resistance to blade buckling, in particular between the blade shear webs and the trailing edge of the blade. Proposed systems include improving the placement of the structural adhesive at the blade trailing edge, to provide a relatively strong bond between blade shells. However, such solutions can result in an increased quantity of structural adhesive used in the blade, which can accordingly increase the cost and weight of the final blade. U.S. Pat. No. 8,047,800 describes a solution wherein an excess of structural adhesive is applied between the trailing edges of a pair of blade shells, but which requires the use of a special tool to draw out excess adhesive through the trailing edge gap between the blade shells prior to curing.

It is an object of the invention to provide a wind turbine blade with improved structural bonding, and an associated method of manufacture.

SUMMARY OF THE INVENTION

Accordingly, there is provided a wind turbine blade formed from a pressure-side blade shell and a suction-side blade shell joined to form a blade body having an airfoil profile with a leading edge and a trailing edge,
said blade comprising at least one sandwich panel construction in said blade shells, wherein a core is disposed between an inner skin and an outer skin of said blade shells,
wherein a structural bond line is arranged adjacent said at least one sandwich panel construction to join a portion of said pressure-side blade shell and a portion of said suction-side blade shell, wherein said structural bond line is spaced from the leading edge and the trailing edge of the wind turbine blade.

By arranging the structural bond line adjacent the sandwich panel of the blade, the buckling strength of the blade structure is increased, as the forces experienced by the bond line are directly transferred into the relatively stiff sandwich panel, which reduces the possibility of crack initiation in the adhesive joints of the bond line between the blade shells. Furthermore, as the adhesive is provided directly adjacent the sandwich panel, the effectiveness of the bond between the shells is increased, which means that less adhesive is required in the blade construction. Preferably, no structural adhesive is provided at the leading and/or trailing edges of the blade, as the structural bond lines between the blade shells are moved to more effective locations, adjacent to or between sandwich panel constructions.

It will be understood that the said at least one sandwich panel construction comprises a core arranged between layers of skin material of a wind turbine blade shell. For example, the sandwich panel construction does not comprise a shear web or spar box structural member. Preferably, the structural bond line comprises an adhesive bond line. It will be understood that the structural bond line preferably solely comprises an adhesive arranged between the blade shells, and does not comprise additional structural inserts.

Preferably, said structural bond line is arranged between a pair of sandwich panel constructions to join said pressure-side blade shell to said suction-side blade shell.

Preferably, there is provided a wind turbine blade formed from a pressure-side blade shell and a suction-side blade shell joined to form a blade body having an airfoil profile with a leading edge and a trailing edge,
said blade comprising at least one trailing edge sandwich panel construction in said blade shells, wherein a core is disposed between an inner skin and an outer skin of said blade shells, said trailing edge sandwich panel construction located in the trailing edge side of the wind turbine blade,
wherein a structural trailing edge bond line is arranged adjacent said at least one trailing edge sandwich panel construction to join said pressure-side blade shell and said suction-side blade shell, said structural trailing edge bond line spaced from the actual trailing edge of the wind turbine blade.

By positioning the structural bond line for the blade trailing edge adjacent a sandwich panel of the blade, the bending forces are more easily absorbed into the at least one sandwich structure of the blade shell. As a result, the trailing edge sandwich panel of the wind turbine blade has a stiffer edge support in the trailing edge region. This can result in savings in the core material used, as thinner sandwich panels are required to provide the same buckling stability, providing for wind turbine blades which are lighter and cost less to manufacture. Testing has shown that a 25% reduction in the amount of core material used is possible with the above configuration.

Furthermore, by moving the structural bond line away from the blade trailing edge, a reduction in the amount of adhesive used is possible, as additional adhesive is not wasted in the region of the trailing edge where the structural effectiveness of the bond line is comparatively worse.

Preferably, said pressure-side blade shell comprises a pressure-side trailing edge sandwich panel construction and said suction-side blade shell comprises a suction-side trailing edge sandwich panel construction, and wherein said structural trailing edge bond line is arranged between at least a portion of said pressure-side and suction side trailing edge sandwich panel constructions.

By providing the structural bonds line between both the pressure- and suction-side sandwich constructions, the bending forces at the trailing edge of the blade are readily distributed into the structural elements of both the pressure- and suction-side shells.

Preferably, said at least one sandwich panel construction is arranged to provide parallel bonding surfaces between said pressure-side blade shell and said suction-side blade shell, wherein said structural trailing edge bond line is arranged between said parallel bonding surfaces.

By providing the structural bond line in an area having parallel bonding surfaces, the structural bond between the blade shells is of a better quality than a comparable bond between non-parallel bonding surfaces. Testing has shown that the Energy Release Rate (ERR) of a bond line arranged between parallel surfaces is 20% less than the ERR for a similar bond between non-parallel surfaces at the trailing edge of a blade. Such a reduction in ERR results in a bond having a reduced possibility of failure or cracking at the bond interface.

Preferably, said at least one sandwich panel construction comprises a core having a tapered end portion, preferably arranged at the trailing edge side of said core, wherein said structural bond line is arranged adjacent said tapered end portion of said core.

Preferably, the wind turbine blade further comprises a non-structural sealant provided at the actual trailing edge of the blade, between opposed trailing edge ends of the pressure- and suction-side shells.

Preferably, a simple sealant can be used, for example a layer of Sikaflex sealant material.

Preferably, said non-structural sealant comprises a thin layer of adhesive.

In a further embodiment, the wind turbine blade comprises a reflective element or marker provided adjacent said structural trailing edge bond line, such that said reflective element or marker is arranged to measure the thickness of said structural trailing edge bond line using a non-destructive testing procedure, for example a magnetically-based scanning technique.

There is further provided a wind turbine having at least one wind turbine blade as described above.

There is further provided a method of manufacturing a part of wind turbine blade, comprising:
  providing a first blade component having a sandwich panel construction in said first blade component, wherein a core is disposed between an inner skin and an outer skin of said first blade component,
  providing a second blade component,
  applying a structural adhesive to at least one of said first and second blade components;
  joining said first and second blade components such that said structural adhesive is arranged adjacent at least a portion of the sandwich panel construction of said first blade component; and
  curing said structural adhesive to form a part of a wind turbine blade, wherein the cured adhesive forms a structural bond line is arranged adjacent said at least one sandwich panel construction to join said first blade component and said second blade component, wherein said structural bond line is spaced from the leading edge and the trailing edge of the wind turbine blade.

Preferably, the method comprises the step of providing a second blade component having a sandwich panel construction in said second blade component, wherein a core is disposed between an inner skin and an outer skin of said second blade component, and wherein said structural adhesive is applied to at least one of said first and second blade components adjacent at least a portion of the sandwich panel construction.

Preferably, said step of joining comprises joining said first and second blade components such that said structural adhesive is arranged between at least a portion of the sandwich panel constructions of said first and second blade components.

Preferably, said first and second blade components comprise wind turbine blade shells.

DESCRIPTION OF THE INVENTION

Embodiments of the invention will now be described, by way of example only, with reference to the accompanying drawings, in which.

It will be understood that elements common to the different embodiments of the invention have been provided with the same reference numerals in the drawings.

Figure 1:
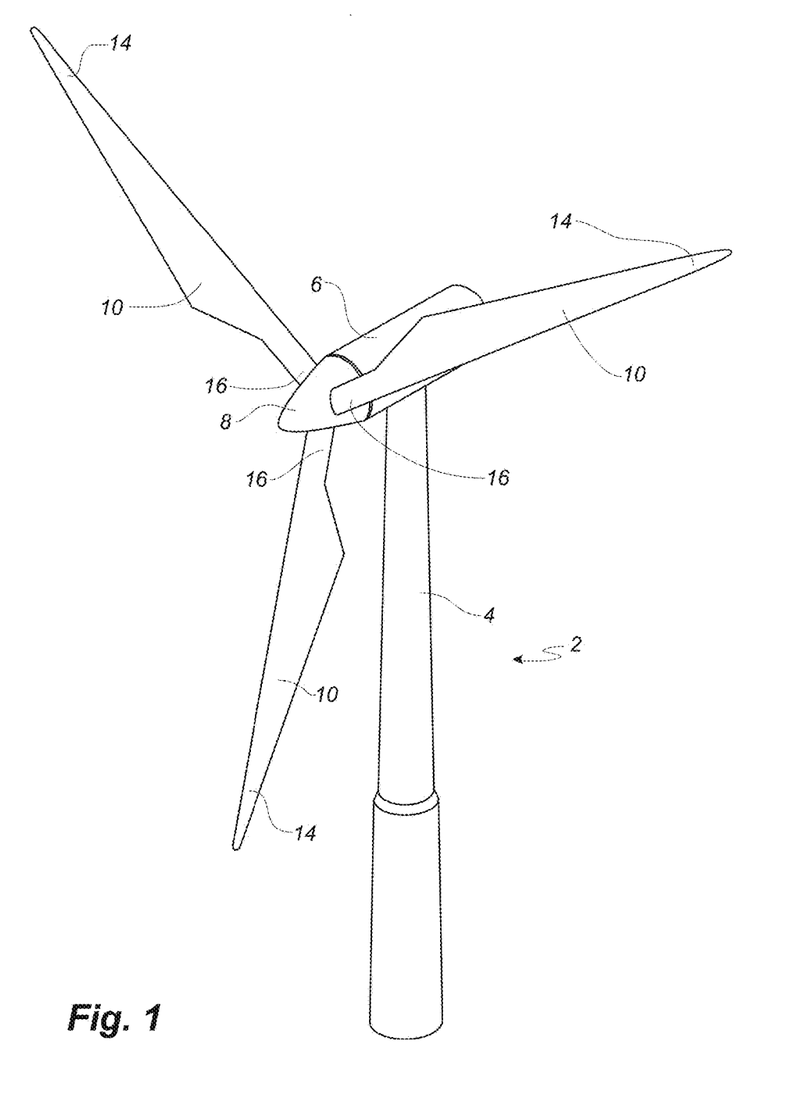
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
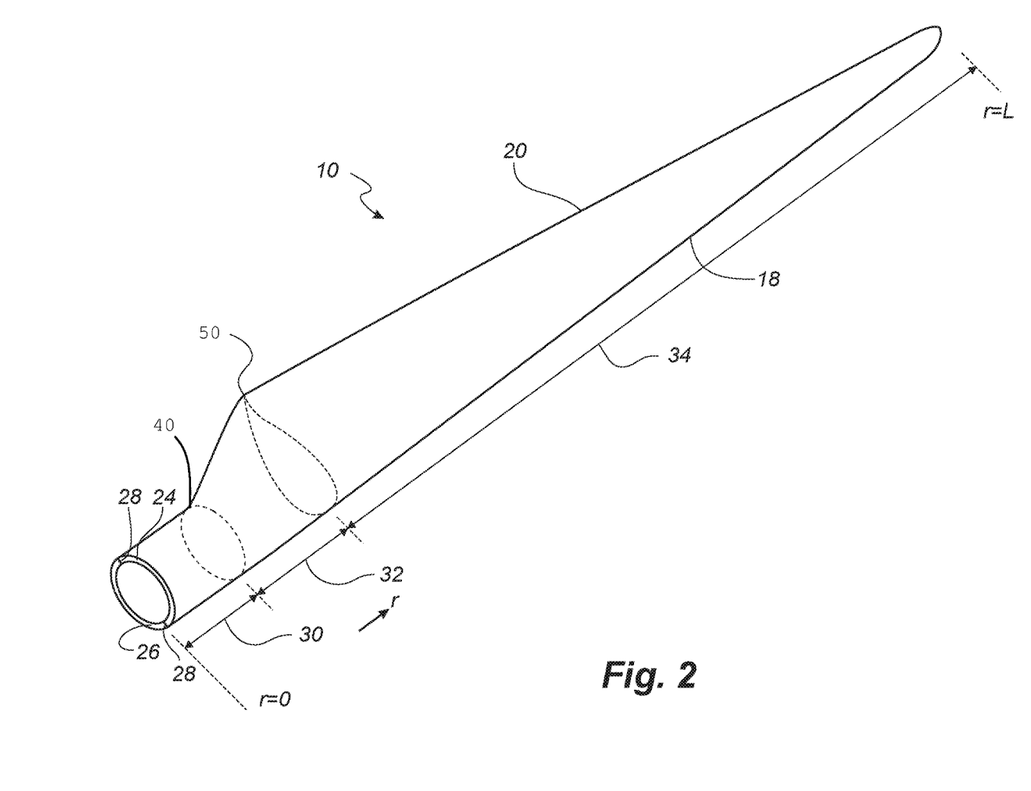
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
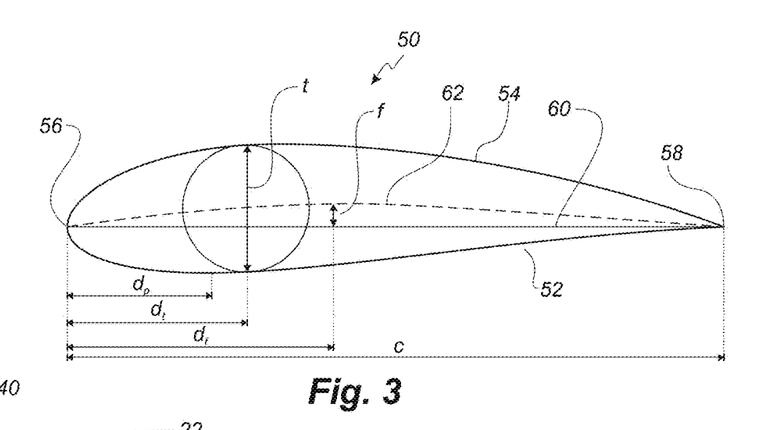
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
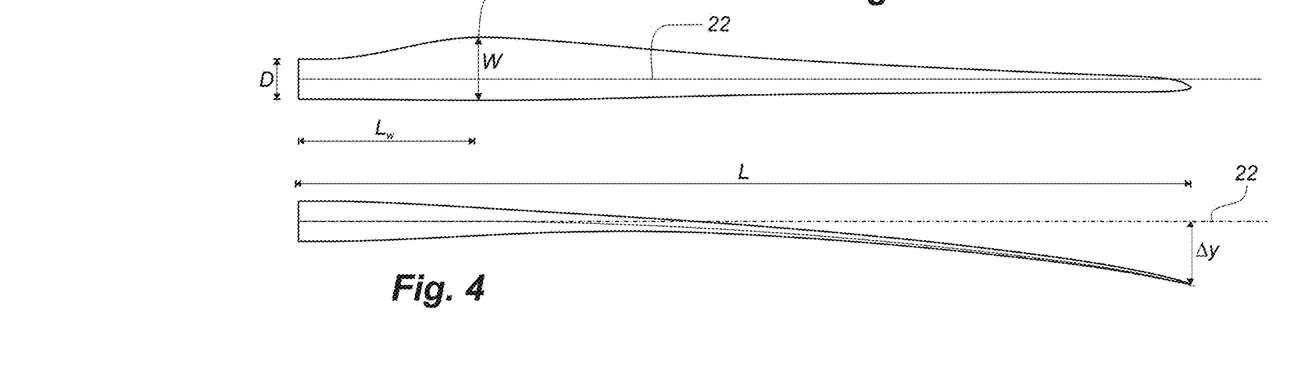
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position r=$L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

Modern wind turbine blades can often be in excess of 30 or 40 meters in length, having blade root diameters of several meters. Wind turbine blades are generally designed for relatively long lifetimes and to withstand considerable structural and dynamic loading.

Figure 5:
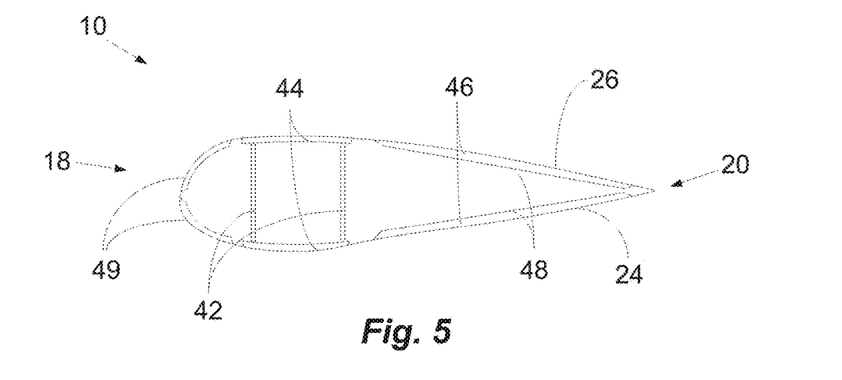
FIG. 5 illustrates a cross-sectional view of a wind turbine blade having a sandwich panel construction.

With reference to FIGS. 2 and 5, the wind turbine blade 10 generally comprises a shell body made of fibre-reinforced polymer, and is typically made as a pressure-side or upwind shell part 24 and a suction-side or downwind shell part 26 that are glued together along bond lines 28 extending along the trailing edge 20 and the leading edge 18 of the blade 10.

Wind turbine blades are generally formed from fibre-reinforced plastics material, e.g. glass fibres and/or carbon fibres which are arranged in a mould and cured with a resin to form a solid structure.

The blade 10 of FIG. 5 comprises a pair of central longitudinal shear webs 42 which extend between the primary structural laminates 44 of the blade 10. The shear webs 42 provide the shear strength of the blade 10. Outside of the location of the main laminates 44, the blade shells 24,26 are of a sandwich panel construction, wherein a core material 46 is provided between the fibre layers of the blade shell body. The core material 46 acts to provide structural stiffness to the relatively thin blade shell walls, and provides resistance to blade buckling. Examples of suitable core material includes balsa wood, foam, e.g. polyeurethane foam, fibre-reinforced foam, bamboo, etc.

In the embodiment of FIG. 5, the blade comprises a trailing edge sandwich panel construction 48 in each of the blade shells 24,26 on the trailing edge 20 side of the shear webs 42, and a leading edge sandwich panel construction 49 in the blade shells 24,26 on the leading edge 18 side of the shear webs 42.

Figure 6:
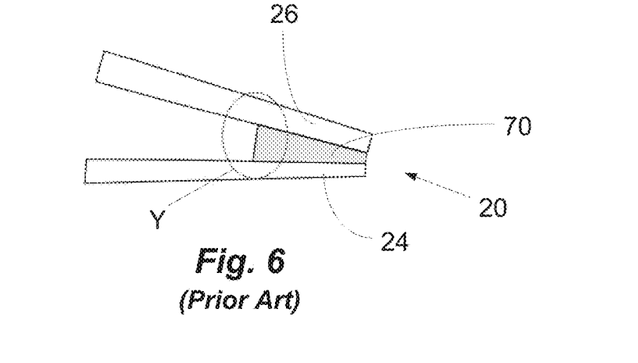
FIG. 6 illustrates an enlarged view of a prior art trailing edge structural bond of a wind turbine blade.

An example of a prior art structural trailing edge bond is shown in FIG. 6, wherein a quantity of adhesive 70 is provided between the pressure-side and suction-side blade shells 24,26 at the trailing edge 20 of said shells 24,26.

Figure 7:
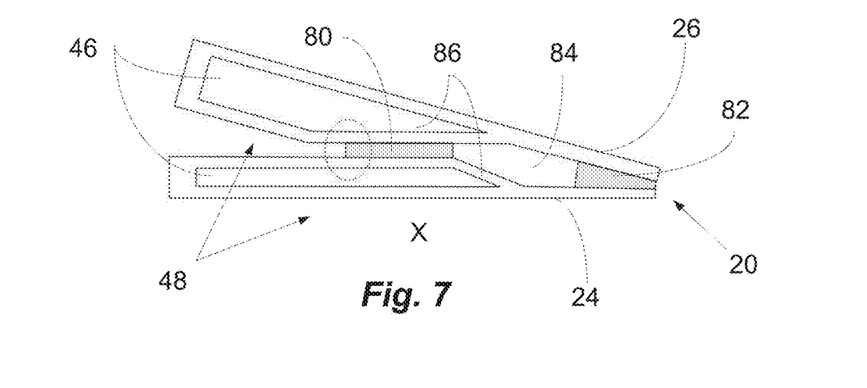
FIG. 7 illustrates an enlarged view of a trailing edge structural bond of a wind turbine blade according to the invention.

With reference to FIG. 7, an enlarged cross-sectional view of a structural trailing edge bond of a blade according to the invention is illustrated. In FIG. 7, structural adhesive 80 is provided as a structural trailing edge bond line between portions of the trailing edge sandwich panel constructions 48 of the blade 10, and is spaced from the actual trailing edge 20 of the blade 10. It will be understood that any suitable adhesive may be used, e.g. vinylester, MMA, etc.

By arranging the structural adhesive bond 80 adjacent and between the sandwich panel constructions 48 of the blade 10, the buckling strength of the blade 10 is increased, as the panel becomes more rigidly supported by the adjacent panel. Furthermore the forces experienced by the bond line are directly transferred into the relatively stiff sandwich panels 48, which reduces the possibility of crack initiation in the adhesive joints of the bond line between the blade shells 24,26.

In addition, as the adhesive 80 is provided as a structural trailing edge bond line directly adjacent the sandwich panels 48, the effectiveness of the bond between the shells 24,26 is increased, which means that less adhesive is required in the construction of the blade 10, to provide the same bond strength. Additionally or alternatively, as the bending forces are transferred directly into the sandwich panel constructions 48, the quantity of core material 46 used in the blade construction can be reduced. Testing of such a blade construction has shown that a 25% reduction in the amount of core material used is possible, through the appropriate re-location of the blade trailing edge structural bond line 80.

Preferably, no structural adhesive 80 is provided at the trailing edge 20 of the blade 10, as the structural bond lines between the blade shells 24,26 are moved to more effective locations, adjacent to or between the sandwich panel constructions 48. In FIG. 7, a simple sealant or non-structural adhesive 82 is located at the actual trailing edge 20 of the blade 10, between the ends of the pressure-side and suction-side blade shells 24,26. The use of such a simple sealant 82 acts to prevent ingress of dirt and moisture into the cavity 84 formed between the trailing edge structural bond line 80 and the pressure-side and suction-side shells 24,26, and furthermore prevents the generation of any operational noise due to the presence of such a cavity at the blade trailing edge 20. The sealant may be any suitable lost-cost, low-weight material, e.g. SikaFlex® provided by Sika AG.

In the embodiment of FIG. 7, the core material 46 used in the sandwich panel constructions 48 comprises a tapered end 86, on that side of the core material 46 facing the trailing edge 20 of the blade 10. The tapered ends 86 of the core material 46 are arranged such that the surface of the tapered end 86 of the core material 46 of the suction-side shell 26 faces a portion of the upper surface of the core material 46 of the pressure-side shell 24, presenting a pair of opposed substantially parallel surfaces of the sandwich panel constructions 46. Accordingly, the structural trailing edge bond line 80 is provided between the opposed parallel surfaces of the sandwich panel constructions 46, resulting in a parallel bond line. Such a parallel bond line presents a considerably stronger bond than the prior art, with an improved resistance to interface failure or cracking between the bond line 80 and the blade shells 24,26.

Testing of components has shown that a structural bond line 80 between a pair of parallel surfaces according to an embodiment of the invention, as illustrated in the highlighted section X of FIG. 7, has a reduced Energy Release Rate (ERR) when compared to a bond line 70 located between angled surfaces at a blade trailing edge, as shown in the highlighted section Y of FIG. 6. Investigations have shown that such a parallel arrangement of bonding surfaces presents an ERR which is 20% less than the ERR for the tested non-parallel surfaces at the trailing edge of a blade.

While the structural bond line is preferably positioned between opposed sandwich panel constructions 48,49, acting to bond portions of the sandwich panel constructions 48,49 together, it will be understood that the structural bond line may be located adjacent to just a single sandwich panel construction 48,49 and a portion of opposed fibre layers of the blade shell body. The bonding of a sandwich panel construction 48,49 of one shell 24,26 to the simple fibre layers of the opposed shell 24,26 provides a moderate improvement in the bond strength and bending stiffness of the bond line, when compared to the prior art approach of bonding opposed fibre layers of the blade 10, outside of the area of the sandwich panel constructions 46,48.

It will be understood that the new configuration of a structural bond line between sandwich regions of a wind turbine blade provides increased joint stability and resistance to buckling, and reduces the risk of crack initiation in the adhesive joint. Accordingly, the quantity of structural adhesive and/or core material used in the manufacture of the blade can be reduced considerably, resulting in a wind turbine blade having reduced weight and cost when compared to the prior art.

The invention is not limited to the embodiments described herein, and may be modified or adapted without departing from the scope of the present invention.

The invention claimed is:

1. A wind turbine blade formed from a pressure-side blade shell and a suction-side blade shell joined to form a blade body having an airfoil profile with a leading edge and a trailing edge,
said blade comprising at least one sandwich panel construction in said pressure-side blade shell and said suction-side blade shell, wherein a core is disposed between an inner skin and an outer skin of said pressure-side blade shell and said suction-side blade shell, wherein said core of said at least one sandwich panel construction has a tapered end portion,
wherein a structural bond line is arranged adjacent said at least one sandwich panel construction to join a portion of said pressure-side blade shell and a portion of said suction-side blade shell, wherein said structural bond line is spaced from the leading edge and the trailing edge of the wind turbine blade,
wherein said at least one sandwich panel construction is arranged to provide parallel bonding surfaces between said pressure-side blade shell and said suction-side blade shell, wherein said structural bond line is arranged between said parallel bonding surfaces, and
wherein said structural bond line is arranged adjacent said tapered end portion of said core of said at least one sandwich panel construction.

2. The wind turbine blade of claim 1, wherein said structural bond line is arranged between a pair of sandwich panel constructions to join said pressure-side blade shell to said suction-side blade shell.

3. The wind turbine blade of claim 1, wherein the wind turbine blade further comprises a non-structural sealant provided at an actual trailing edge of the blade, between opposed trailing edge ends of the pressure-side blade shell and the suction-side blade shell.

4. The wind turbine blade of claim 3, wherein said non-structural sealant comprises a polyeurethane-based adhesive.

5. The wind turbine blade of claim 1, wherein the wind turbine blade comprises a reflective element or marker provided adjacent said structural bond line, such that said reflective element or marker is arranged to measure the thickness of said structural bond line using a non-destructive testing procedure.

6. The wind turbine blade of claim 5, wherein the non-destructive testing procedure is a magnetically-based scanning technique.

7. A wind turbine having at least one wind turbine blade as claimed in claim 1.

8. The wind turbine blade of claim 1, wherein the tapered end portion is arranged at a trailing edge side of said core.

9. A method of manufacturing a part of a wind turbine blade, comprising:
providing a first blade component having a sandwich panel construction in said first blade component, wherein a core is disposed between an inner skin and an outer skin of said first blade component, said core having a tapered end portion,
providing a second blade component,
applying a structural adhesive to at least one of said first and second blade components;
joining said first and second blade components such that said structural adhesive is arranged adjacent at least a portion of the sandwich panel construction of said first blade component, said structural adhesive arranged adjacent said tapered end portion of said core of said sandwich panel construction; and
curing said structural adhesive to form the part of a wind turbine blade, wherein the cured structural adhesive forms a structural bond line arranged adjacent said sandwich panel construction to join said first blade component and said second blade component, wherein said structural bond line is spaced from the leading edge and the trailing edge of the wind turbine blade and wherein said sandwich panel construction is arranged to provide parallel bonding surfaces between said first blade component and said second blade component, wherein said structural bond line is arranged between said parallel bonding surfaces.

10. The method of claim 9, wherein the method comprises the step of providing a second blade component having a sandwich panel construction in said second blade component, wherein a core is disposed between an inner skin and an outer skin of said second blade component, and wherein said structural adhesive is applied to at least one of said first and second blade components adjacent at least a portion of the sandwich panel construction.

11. The method of claim 9, wherein said step of joining comprises joining said first and second blade components such that said structural adhesive is arranged between at least a portion of the sandwich panel constructions of said first and second blade components.

12. The method of claim 9, wherein said first and second blade components comprise wind turbine blade shells.

* * * * *